United States Patent [19]

Roudebush et al.

[11] 4,112,173

[45] Sep. 5, 1978

[54] CONCRETE MODULE UNIT

[75] Inventors: Allen T. Roudebush, Hamilton, Ohio; Kenneth P. Thompson, Canton, N.C.

[73] Assignee: Champion International Corporation, Stamford, Conn.

[21] Appl. No.: 768,770

[22] Filed: Feb. 15, 1977

Related U.S. Application Data

[62] Division of Ser. No. 547,003, Feb. 4, 1975, abandoned.

[51] Int. Cl.$^2$ ........................ B32B 13/12; B32B 27/10; B32B 7/06

[52] U.S. Cl. .................................... 428/215; 428/218; 428/220; 428/339; 428/448; 428/451; 428/452; 428/513

[58] Field of Search ............... 428/213, 215, 220, 339, 428/341, 513, 448, 451, 452, 218

[56] References Cited

U.S. PATENT DOCUMENTS 2,677,165 5/1954 Copenhaver et al. ............... 249/134

3,927,245 12/1975 Roth .................................... 428/513

FOREIGN PATENT DOCUMENTS 1,050,979 12/1966 United Kingdom ..................... 249/134

OTHER PUBLICATIONS

Table 8.8, "Blow Molding", Jones & Mullen, Reinhold Pub. Corp., 1971, p. 85.

*Primary Examiner*—James R. Hoffman

*Attorney, Agent, or Firm*—Roylance, Abrams, Berdo & Farley

[57] ABSTRACT

A casting sheet comprising medium to high density polyethylene provides low release resistance when used as a liner for casting concrete articles. The casting sheet may comprise polyethylene-coated paperboard having a polyethylene coating on both sides, and such sheet be employed, for example, as a separator for concrete wall panels cast on-site in a superposed manner for tilt-slab construction or for other concrete construction.

13 Claims, 3 Drawing Figures

CONCRETE MODULE UNIT

This is a division of application Ser. No. 547,003, filed Feb. 4, 1975 and now abandoned.

This invention relates to a casting sheet for use in concrete forms, said sheet being easily releasable from the molded concrete article, while providing a smooth, glossy surface on the concrete exterior adjacent thereto, and to the use of such casting sheet in the production of concrete articles. More particularly, this invention relates to a casting sheet comprising medium to high density polyethylene, and to the use of such casting sheet as a bond-breaker for casting concrete.

The production of precast tilt-up concrete modules is a well-known technique used in building construction, and has been widely used in building modern factories, warehouses, and office buildings. The concrete wall panels made by such method may be extremely large, and are often in excess of 30 feet in one dimension. Moreover, such panels range in thickness of from less than 6 inches to more than 20 inches. The dimensions of such panels will depend upon the particular construction requirements. Conventionally, the technique employed in producing precast tilt-up concrete modules involves the placement of wooden forms upon a curing floor or base slab, and the concrete slurry is poured into the panel frame, permitted to cure, and then the forms are removed. The horizontal surface of the base slab has been covered with a hydrophobic bond-breaker, such as oil containing paraffin wax, silicones, hydrophobic surfactants, or the like. However, such hydrophobic bond-breaking agents are costly and there are problems with the means for applying such materials at construction sites.

Another proposal has been the use of polyethylene as a bond-breaker, and recent attempts have been made to utilize paper coated with polyethylene as a casting sheet. However, the use of such material has been highly unsatisfactory in view of the difficulty in removing the polyethylene-coated sheets from the concrete panels which are adjacent thereto. Thus, the poor release characteristics of the polyethylene sheets heretofore employed has required the construction worker to strip off the polyethylene sheet by hand even after the large, e.g., 30 feet high or more, wall panel was in place.

It has now been discovered that a casting sheet highly suitable for casting concrete can be provided, which sheet has a low release resistance, i.e., will not stick, when separated from the cured concrete, said sheet comprising a medium to high density polyethylene having a density in the range of between about 0.930 and about 0.965 grams per cubic centimeter. Surprisingly, it has been discovered that a paper substrate, for example, can be coated on at least one side thereof with medium to high density polyethylene and the resulting sheet can be advantageously used as a liner for concrete forms. The coated release sheet will provide a low release resistance when the liner is to be separated from the concrete and will produce a smooth, glossy surface on the exterior surface portion of the cast concrete article that had been adjacent the casting sheet.

Thus, according to the one embodiment of the present invention, a casting sheet for concrete forms is provided, said sheet having a low release resistance when separated from substantially cured concrete, which casting sheet has at least one side coated with polyethylene having a density in the range of between about 0.930 and 0.965 grams per cubic centimeter. The opposite side of the substrate may be uncoated or, for example, may be coated with polyethylene of any density as hereinafter described.

According to another embodiment of the present invention, a form unit is provided for casting concrete articles, which comprises a molding form circumscribing and defining a chamber having a predetermined configuration for receiving a concrete slurry, with at least one interior surface of the chamber being provided with a casting sheet which comprises high density polyethylene.

According to a further embodiment of the present invention, an assembly is provided for use in the construction of building walls, which comprises a plurality of spaced, superposed concrete module layers, a plurality of casting sheets having a low release resistance, the casting sheets comprising medium to high density polyethylene, with each of the modular layers being separated one from the other by the casting sheet. Such assembly provides tilt-slab concrete wall panels that may be cast on-site, and which may be lifted from the assembly and fit into place at the construction site, while being easily separated from the polyethylene casting sheet. Moreover, the casting sheets of the present invention produce a smooth, glossy surface on the concrete panel, or, alternatively, will permit the production of a textured exterior wall from which the casting sheet of the present invention easily releases.

Referring now to the drawings.

Figure 1:
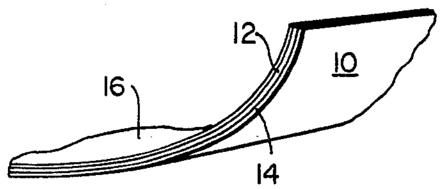
FIG. 1 is a partial perspective of the casting sheet of the present invention.

The invention may be better understood by reference to the drawings. Referring now to FIG. 1, a thin flexible casting sheet 10 is provided having a paper or paperboard (hereinafter "paper") substrate or base sheet 12 and a coating of medium to high density polyethylene 16. The opposite side of substrate 10 is optionally coated with polyethylene, which may be of any density, for weather-proofing purposes. A low density polyethylene coating 14 may be therefore suitably employed in combination with a medium to high density coating 16.

Polyethylene resin is available in a wide range of densities. Generally, low density polyethylene is considered to have a density in the range of about 0.910 to 0.925 grams per cubic centimeter, while high density polyethylene is generally considered to have a density in the range of 0.940 to 0.965 grams per cubic centimeter. The polyethylene employed in producing the casting sheets of the present invention may have a density of from 0.930 to 0.965 grams per cubic centimeter. However, the preferred polyethylene density is high density polyethylene in the range of between 0.940 and 0.965 grams per cubic centimeter, with polyethylene having a density of 0.965 gm./cc being especially preferred. As will be hereinafter demonstrated, low density polyethylene having a density of below 0.925 gm./cc is unacceptable for commercial use, since its release resistance is too high.

The substrate upon which the polyethylene is coated is preferably paper, e.g., paperboard. However, any paper thickness is acceptable including thin, kraft stock. Exemplary substrates include paper having a thickness in the range of between about 0.008 and about 0.035 inch. Preferably, the substrate has a thickness of at least 0.025 inch thick to avoid local distortion of the smooth surface of the concrete above from the rough surface below in the case of tilt slab construction. However, any suitable thickness paper may be utilized in the present invention. Also, substrates other than paper, e.g., plywood, may be employed; however, paper is preferred for purposes of economy and strength.

Any conventional means for coating with paper with the polyethylene of the present invention may be employed. The most common means for coating polyethylene onto paper is the use of an extrusion coating system, wherein the polyethylene is extruded into a film of molten plastic from a slot-shaped dye which is arranged a short distance from a press nip formed by two pressure rolls through which the polyethylene film and a paper substrate are simultaneously passed, thereby bonding the hot film thoroughly to the paper. One of the pressure rolls is usually rubber-covered and is shielded by the paper web, while the second pressure roll is conventionally metal-covered, e.g., chrome-plated, and serves to secure the release of the hot extruded polyethylene film while bonded to the paper. Other systems involve the use of an electrode structure for creating an electric field in the region of convergence between the polyethylene and the paper. However, any suitable coating system may be employed, so long as it is capable of coating and providing polyethylene having the requisite density onto paper.

The particular coating procedure that is utilized may have an effect upon the final density of the polyethylene that is present on the substrate. For example, all polyethylenes, regardless of density range, have a slightly lower density after extrusion depending upon the extrusion conditions employed. Thus, the exact density of a particular polyethylene cannot be know without knowing the total previous heat history, e.g., extrusion conditions including quenching rate, post annealing conditions, etc. Accordingly, if extrusion coating is utilized, it is common practice to specify the density of the polyethylene as it exists just prior to extrusion. The density values of the polyethylene of Table I, hereinafter presented, for example, refer to the density of the polyethylene as fed to the extruder. Regardless of the coating method employed, the final polyethylene of the present invention as coated will preferably have a density greater than about 0.930, and, as previously indicated, is preferably in the range of between about 0.940 and about 0.965 gm./cc.

The polyethylene may be coated onto the substrate at any desired thickness. For example, a polyethylene film having a thickness of between about 0.0005 inch and about 0.006 inch may be suitably coated onto paperboard and utilized successfully.

Figure 2:
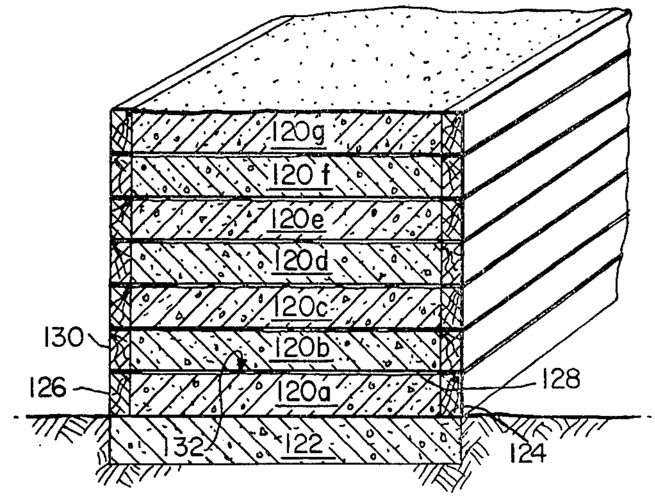
FIG. 2 is a perspective view in section of tilt-slab concrete wall panels separated by the casting sheets of the present invention; and, FIG. 3 is a perspective view showing the easy separation of the casting sheets of the present invention from concrete panels as each is separated from the remainder of the panel assembly for use in construction.

Referring now to FIG. 2, a plurality of superposed concrete panels **120*a*, 120*b*, 120*c*, 120*d*, 120*e*, 120*f*, and 120*g* are shown supported on a base slab 122. Base slab 122 is utilized for support purposes and is formed with a horizontal surface, such as by pouring a concrete slab sufficiently thick to support the weight of panels 120*a*–120*g*. After a suitable base slab 122 is provided, casting sheet 124, which is paperboard coated on at least the top side with polyethylene having a density of about 0.965 gm./cc., is provided thereon. On top of sheet 124 is placed rectangular form 126 for casting a concrete wall panel. Concrete slurry is introduced into form 126 and screeded. Upon curing, a concrete panel 120*a* is formed. A second casting sheet 128 is then superposed upon concrete wall panel 120*a* after brief curing and form 130 is superposed over panel 120*a*, as shown. Concrete slurry is introduced into form 130 to form wall panel 120*b*. This procedure is repeated in the foregoing manner to provide concrete wall panels 120*c*–120*g*.**

Referring again to panel **120*a*, it should be noted that prior to the application of release sheet 128, upper surface 132 of panel 120*a* may be provided with a textured surface, e.g., it may be brush- or pebble-finished, prior to placing casting sheet 128** thereon.

Once panel **120*g*** has cured to sufficient strength, it can be removed from the stack and positioned adjacent another of a plurality of such panels to form the desired building wall or the like.

Figure 3:
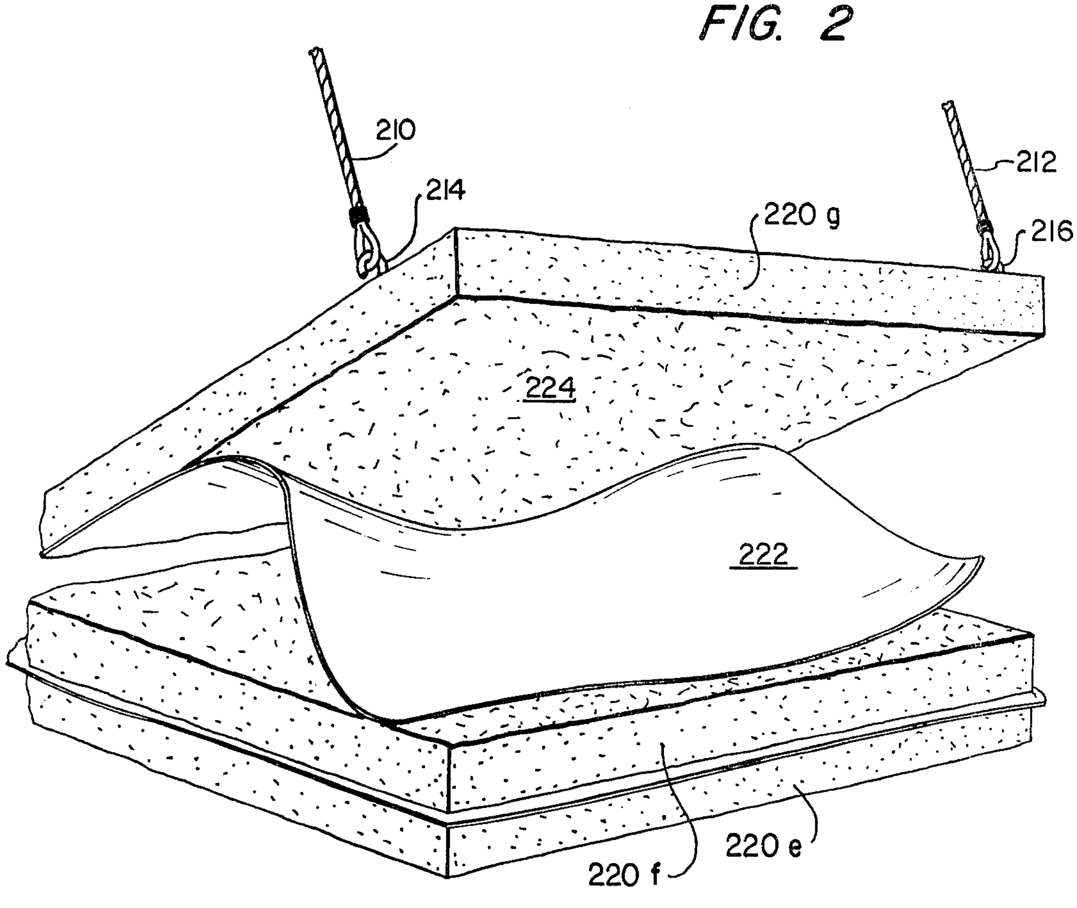

Referring to FIG. 3, cables 210 and 212 are attached to panel **220*g* by means of attachments 214 and 216, respectively. The cables are attached to a crane or other lifting device (not shown). As illustrated in FIG. 3, release sheet 222 falls away from the panel 220*g*** without difficulty and without the need of assistance from a workman. The panel is then hoisted into place and affixed to the particular construction in a conventional manner.

The employment of the casting sheet of 222 of the present invention can produce a smooth and glossy interior wall surface 224 on the underside of panel **220*g*, while leaving a rough brush or pebbled texture on the exterior (or upper surface) of 220*f*.**

Although the utilization of the casting sheets of the present invention have been described in connection with tilt-slab construction, the casting sheets find usage as liners for concrete mold forms whenever an easily releasable system is desired. Additionally, the casting sheets of the present invention may be employed in the casting of concrete articles wherein a smooth interior surface is desired. For example, the use of the present casting sheets in the formation of interior concrete stairs provides a smooth, glossy interior surface for the underside of stairwells that eliminates the need for any painting or hand finishing of any type, and the resulting concrete surface is easier to clean and keep clean. Alternatively, a smoother surface is provided for painting if desired for decorative effect.

Also the present release sheets may be utilized to line "knock-outs" in slabs wherein wooden forms or foam blocks having a rectangular cross-section, for example, are inserted in a horizontal slab to provide for windows and service entrances. The vertical surfaces of the knock-outs may be covered with the release sheets of the present invention and thus permit the easy removal of the forms or blocks after curing and provide a clean opening. Similarly, the release sheets of the present invention may be used to provide self-supporting mold forms for casting column forms, for example.

The following examples further illustrate the present invention.

EXAMPLES 1–10

In order to demonstrate the release properties of the casting sheet of the present invention, test samples of commercial "Sakrete" "Concrete Mix" are mixed with water at a concentration of one pound of water per 9 pounds of dry "Sakrete" in a uniform manner. The resulting concrete slurry is poured into paper testing rings (paper mill fiber "cores"), having a seven-inch outside diameter, a six-inch inside diameter, and a depth of 1.5 inch. Meanwhile, various samples of polyethylene resin having different densities are extrusion-coated onto kraft paper, and each sample is inserted in a paper ring with the polyethylene side up. A thin bead of caulk is run around the seam to prevent the concrete from running over the casting paper through the seam. The outside of the ring is sealed with an acetate tape.

The casts are made in quadruplicate so as to permit testing samples at four monthly intervals. The samples are then stacked six high at random, weighed, and put into polyethylene bags to retain moisture and to partially simulate the effects of the field construction of concrete slabs.

The results are set forth in Table I, below.

Table I

| | | | Release (lb./linear in.) | | | |
|---|---|---|---|---|---|---|
| Ex. No. | Caliper (.001") | Density (gm./cc.) | Initial | 1 mo. | 2 mos. | 3 mos. |
| 1 | 32 | .923 | .25-.50 | 1.0-1.5 | 2.0 | 3.0 |
| 2 | 13 | .942 | None | None | None | None |
| 3 | 13 | .955 | None | None | None | None |
| 4 | 33 | .965 | None | None | None | None |
| 5 | 8 | .923 | None | .25 | None | .5-1.0 |
| 6 | 16 | .930 | None | None | None | None |
| 7 | 13 | .935 | None | None | None | None |
| 8 | 11 | .950 | None | None | None | None |
| 9 | 8 | .960 | None | None | None | None |
| 10 | 8 | .960 | None | None | None | None |

As seen by the results in Table I, the polyethylene coatings having a density of 0.923 in Examples 1 and 5, require from slight to medium pressure depending upon the cure time of the concrete, while the samples employing polyethylene having a density of from 0.930 to 0.965 in Examples 2-4 and 6-10, easily release from the sample without any measurable release resistance.

Although the invention has been described in considerable detail with particular reference to certain preferred embodiments thereof, variations and modifications can be effected within the spirit and scope of the invention as described hereinbefore, and as defined in the applied claims.

What is claimed is:

1. An assembly for use in the construction of building walls, which comprises a plurality of spaced, superposed concrete module layers and a plurality of thin, flexible casting sheet means having a low release resistance when separated from said module layers after hardening thereof, each of said casting sheet means comprising a thin, flexible base sheet, each of said base sheets being generally planar, at least one side of each base sheet having a thin coating of polyethylene having a density of 0.930 to 0.965 gm./cc., each of said module layers being separated from the other of said module layers by said casting sheet means.

2. The assembly of claim 1, wherein said module layers each have substantially indentical dimensions.

3. The assembly of claim 1, wherein each polyethylene coating is in the form of a film having a thickness of 0.0005 to 0.006 inch.

4. The assembly of claim 1, wherein each base sheet has an additional coating of polyethylene on the other side of each base sheet.

5. The assembly of claim 4, wherein each additional coating of polyethylene has a density less than that of the polyethylene coating on the one side of its base sheet.

6. The assembly of claim 1, wherein each base sheet is formed of paper.

7. The assembly of claim 1, wherein each of said module layers is a wall panel in excess of 30 feet in one dimension.

8. A concrete module unit comprising a concrete layer having a thin, flexible casting sheet means having a low release resistance when separated from said concrete layer after hardening thereof superimposed adjacent at least one surface of said concrete layer, said casting sheet means comprising a thin, flexible base sheet, said base sheet being generally planar, at least one side of said base sheet having a thin coating of polyethylene having a density of 0.930 to 0.965 gm./cc., said polyethylene coating being in contact with said surface of said concrete layer.

9. The module unit of claim 8 wherein said polyethylene coating is in the form of a film having a thickness of 0.0005 to 0.006 inch.

10. The module unit of claim 8, wherein said base sheet has an additional coating of polyethylene on the other side of said base sheet.

11. The module unit of claim 10, wherein said additional coating of polyethylene has a density less than that of the polyethylene coating on said one side of said base sheet.

12. The module unit of claim 8, wherein said base sheet is formed of paper.

13. The module unit of claim 8, wherein said casting sheet means is capable of falling away from the hardened concrete layer under its own weight.

* * * * *